United States Patent
Huang

(10) Patent No.: US 8,474,481 B2
(45) Date of Patent: Jul. 2, 2013

(54) MANUAL/AUTOMATIC AND COLD/HOT FAUCET WITH A CERAMIC VALVE

(75) Inventor: Su Huang, Nantou Hsien (TW)

(73) Assignee: Hydrotek Corporation, Nantou Hsien (TW)

( * ) Notice: Subject to any disclaimer, the term of this patent is extended or adjusted under 35 U.S.C. 154(b) by 358 days.

(21) Appl. No.: 13/074,288

(22) Filed: Mar. 29, 2011

(65) Prior Publication Data

US 2012/0248351 A1  Oct. 4, 2012

(51) Int. Cl.
| F16K 11/16 | (2006.01) |
| F16K 11/18 | (2006.01) |
| F16K 11/24 | (2006.01) |
| F16K 27/04 | (2006.01) |
| F16K 31/02 | (2006.01) |

(52) U.S. Cl.
USPC .................. 137/607; 137/599.03; 137/625.42

(58) Field of Classification Search
USPC .............. 137/599.03, 607, 625.4, 637.4, 312, 137/315.12, 315.13, 315.14, 625.41, 605, 625.28–625.39; 251/129.04
See application file for complete search history.

(56) References Cited

U.S. PATENT DOCUMENTS

| 5,167,255 | A | * | 12/1992 | Gohring et al. | 137/607 |
| 5,402,827 | A | * | 4/1995 | Gonzalez | 137/625.17 |
| 6,019,130 | A | * | 2/2000 | Rump | 137/601.01 |
| 6,321,786 | B2 | * | 11/2001 | Schumacher | 137/613 |
| 2010/0012194 | A1 | * | 1/2010 | Jonte et al. | 137/1 |
| 2010/0139793 | A1 | * | 6/2010 | Carignan et al. | 137/625.17 |

* cited by examiner

*Primary Examiner* — Stephen M Hepperle
*Assistant Examiner* — Seth W MacKay-Smith
(74) *Attorney, Agent, or Firm* — Ming Chow; Sinorica, LLC

(57) ABSTRACT

A manual/automatic and cold/hot faucet with a ceramic valve includes a main body adopting a ceramic valve that is connected with an automatic water exit passage and a manual water exit passage. The ceramic valve has a fixing member and a sliding member, with the sliding member sliding against the fixing member to command water to flow into the automatic water exit passage or the manual water exit passage. So the faucet can give water automatically or manually. As the ceramic valve is excellently resistant to abrasion, the present faucet can thus be durable, not apt to get leaked.

7 Claims, 11 Drawing Sheets

MANUAL/AUTOMATIC AND COLD/HOT FAUCET WITH A CERAMIC VALVE

BACKGROUND OF THE INVENTION

1. Field of the Invention

This invention relates to a manual/automatic and cold/hot faucet with a ceramic valve.

2. Description of the Prior Art

With living quality upgraded by technical improvement, faucets are required not only to provide cold/hot water, but also to be installed with a sensor, such as an infrared device, so as to automatically give water as long as being induced. However, if power is out of work or exhausted, the sensor cannot be induced to provide water. In order to avoid such a condition, a manual/automatic faucet has been devised, with a control valve installed atop for being used manually to control water to flow out or not while the sensor is out of order. As the control valve must have plural passages to let water flow manually or automatically and to control the volume of cold and hot water, it has to be cast with copper, which has a poor resistance to abrasion. So the copper control valve is prone to leakage after being used for a certain period of time; it has often been complained by users. Although control valves have been made of ceramic instead of copper, they can only be shaped with one passage, unable to be applied to the manual/automatic control valve said previously.

SUMMARY OF THE INVENTION

The object of this invention is to offer a manual/automatic and cold/hot faucet with a ceramic valve.

The main characteristics of the invention are a main body, a ceramic valve, an electromagnetic valve and a sensor. The main body is provided with a water exit tube located at the top, an accommodating chamber and a valve room. The main body is also provided with a cold water passage, a hot water passage and an automatic water entering passage communicating with the accommodating chamber and the water exit tube, an automatic water exit passage communicating with the accommodating chamber and the water exit tube, and a manual water exit passage communicating with the valve room and the water exit tube. The ceramic valve is installed in the valve room, provided with a fixing member made of ceramic. The fixing member has a cold water hole communicating with the cold water passage, a hot water hole communicating with the hot water passage, and a water exit hole communicating with the manual water exit passage. A ceramic sliding member is installed at one side of the fixing member, provided with a notch formed at some point of the circumference to communicate with the cold water hole, the hot water hole and the automatic water entering passage. Formed in the center of the sliding member is a groove utilized to communicate with the water exit hole. The sliding member can be horizontally moved against the fixing member to a first position and a second position. When the sliding member is positioned at the first position, the groove can only communicate with the water exit hole. When the sliding member is positioned at the second position, the groove can communicate with the cold water hole, the hot water hole and the water exit hole. The ceramic valve is further provided with a valve rod connected with the sliding member so as to command the sliding member to slide against the fixing member. The electromagnetic valve is connected with the automatic water entering passage and the automatic water exit passage, employed to control water flowing from the automatic water entering passage to the automatic water exit passage. The sensor is electrically connected with and commands the electromagnetic valve.

In the present faucet, the sliding member can horizontally slide against the fixing member to a first position and a second position. At the first position, the groove of the sliding member can only communicate with the water exit hole, so that water can only flow from the notch of the sliding member to the automatic water exit passage. At the second position, the groove of the sliding member can communicate with the cold water hole, the hot water hole and the water exit hole, so that water can flow to the manual water exit passage. Therefore, the manual/automatic and cold/hot faucet of the present invention can give water automatically or manually. And, as the ceramic valve is highly resistant to abrasion, the faucet can thus function durably, not apt to get leaked.

BRIEF DESCRIPTION OF DRAWINGS

This invention is better understood by referring to the accompanying drawings, wherein.

DETAILED DESCRIPTION OF THE PREFERRED EMBODIMENT

Figure 1:
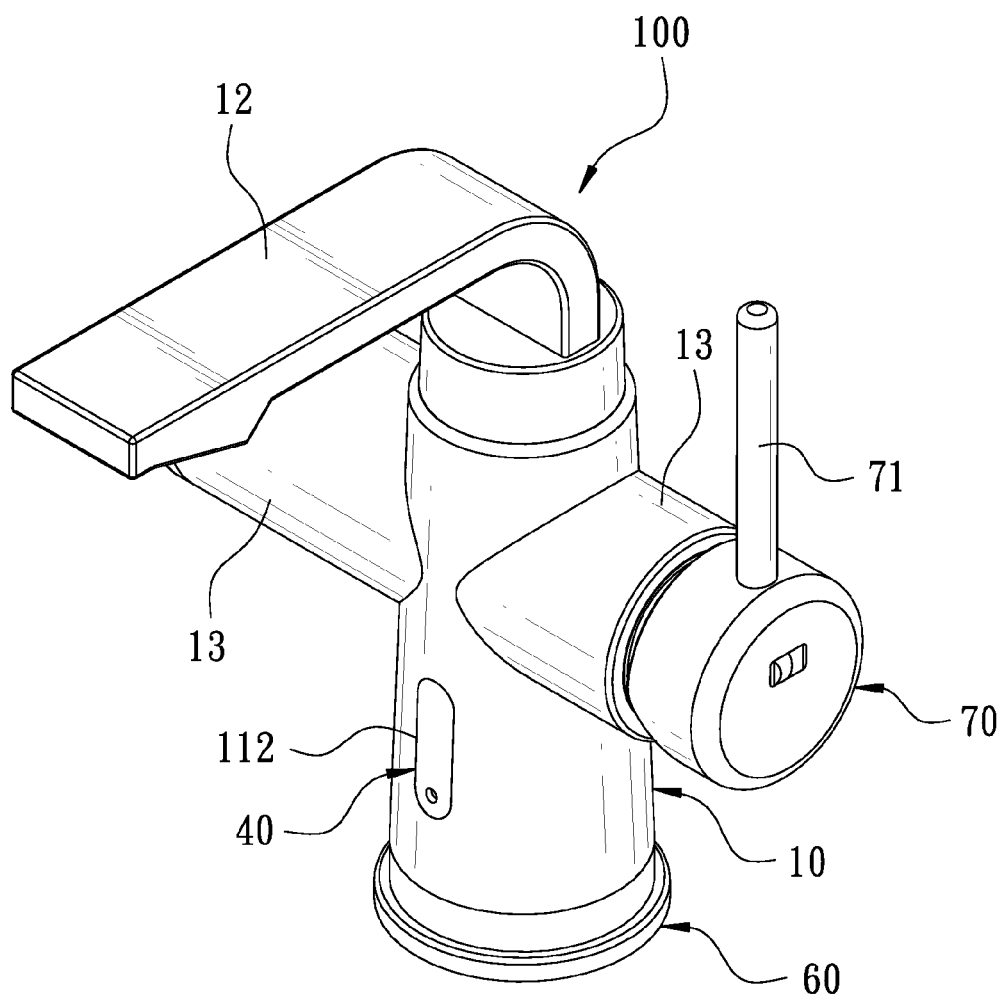
FIG. 1 is a perspective view of a preferred embodiment of a manual/automatic and cold/hot faucet with a ceramic valve in the present invention.
Figure 2:
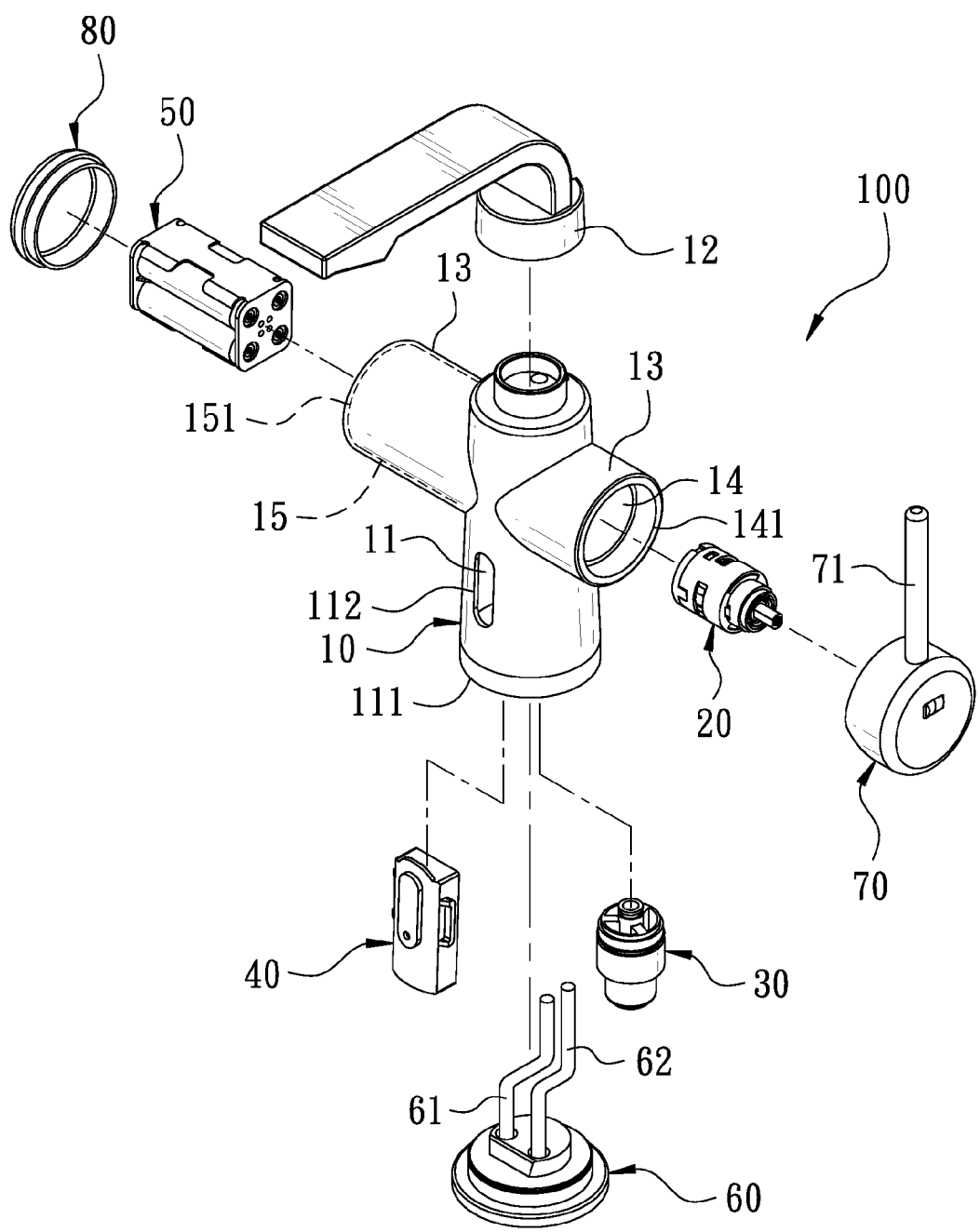
FIG. 2 is an exploded perspective view of the preferred embodiment of a manual/automatic and cold/hot faucet with a ceramic valve in the present invention.
Figure 3:
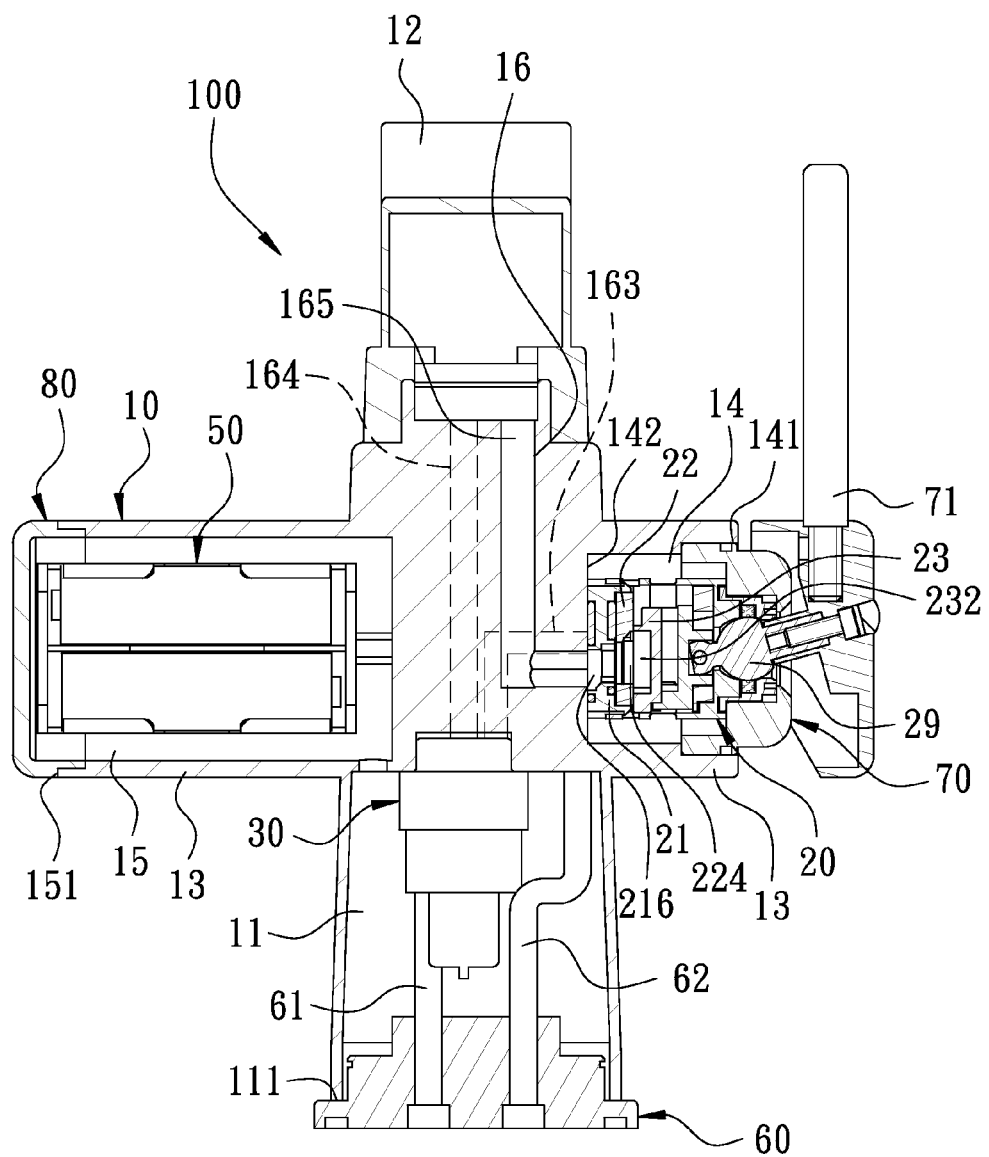
FIG. 3 is a vertical cross-sectional view of the preferred embodiment of a manual/automatic and cold/hot faucet with a ceramic valve in the present invention.

As shown in FIGS. 1~5, a preferred embodiment of a manual/automatic and cold/hot faucet 100 with a ceramic valve in the present invention includes a main body 10, a ceramic valve 20, an electromagnetic valve 30, a sensor 40, a battery set 50, a fixing base 60, a valve base 70 and a cap 80.

Figure 4:
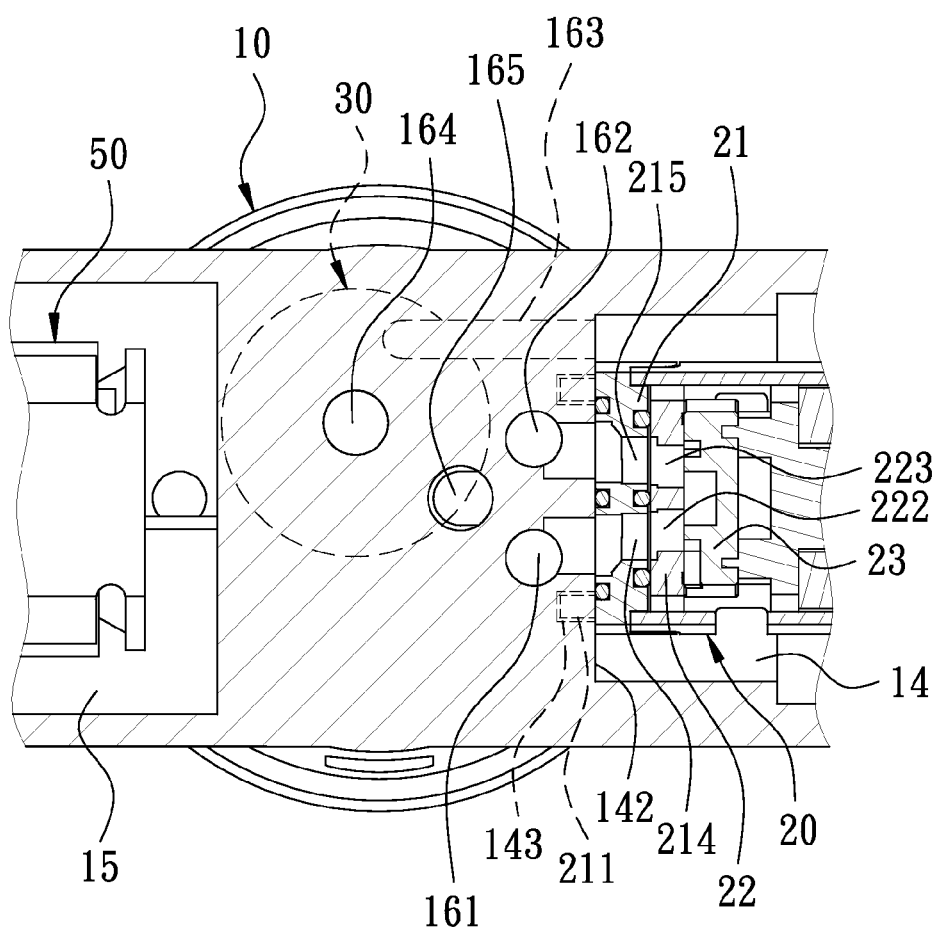
FIG. 4 is a partial horizontal cross-sectional view of the preferred embodiment of a manual/automatic and cold/hot faucet with a ceramic valve in the present invention.
Figure 5:
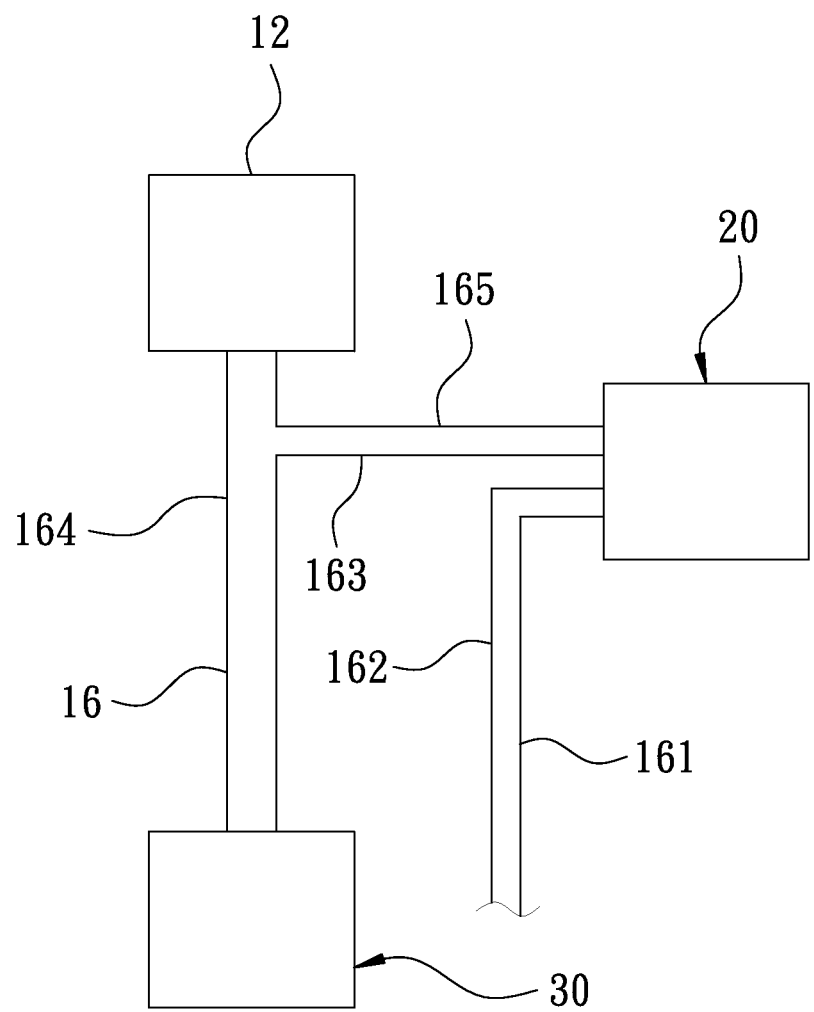
FIG. 5 is a diagram of a passage system in the present invention, showing how its components are connected.

The main body 10 is provided with an accommodating chamber 11 formed in the bottom portion, a water exit tube 12 located at the top, and a pair of extending portions 13 horizontally protruded outward at two sides. Formed in the bottom of the accommodating chamber 11 is a chamber opening 111 and cut in the circumference of the main body 10 is an inducing hole 112 communicating with the accommodating chamber 11. A valve room 14 is formed in one of the extending portions 13 and a battery room 15 is formed in another extending portion 13. Formed in the free end of each of the extending portions 13 is a valve room opening 141 and a battery room opening 151 respectively, with the valve room opening 141 communicating with the valve room 14 and the battery room opening 151 communicating with the battery room 15. As shown in FIG. 4, at least a fixing groove 143 is formed on an inner wall 142 of the valve room 14. Furthermore, the main body 10 is also provided with a passage system 16, which includes a cold water passage 161, a hot water passage 162 and an automatic water entering passage 163 communicating with the accommodating chamber 11 and the water exit tube 12, an automatic water exit passage 164 communicating with the accommodating chamber 11 and the water exit tube 12, and a manual water exit passage 165 communicating with the valve room 14 and the water exit tube 12.

Figure 6:
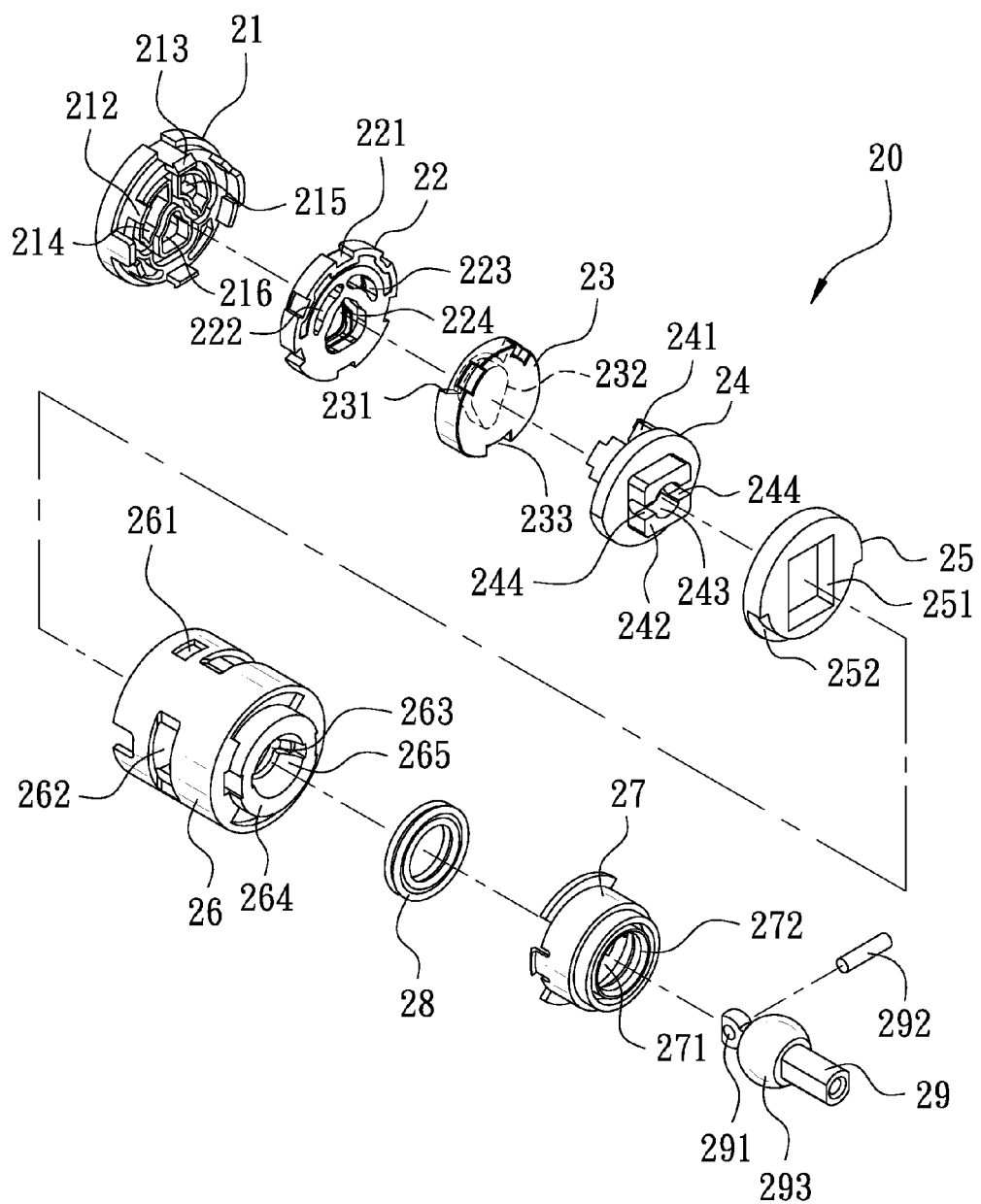
FIG. 6 is an exploded perspective view of a ceramic valve in the present invention.

The ceramic valve 20 is installed in the valve room 14, consisting of a base 21, a fixing member 22, a sliding member 23, a linking member 24, a restricting member 25, a shell 26, a bush 27, a washer 28 and a valve rod 29, as shown in FIG. 6.

The base 21 is provided with a fixing rod 211 correspondingly fitted in the fixing groove 143 so that the base 21 can be positioned on the inner wall 142 of the valve room 14, as shown in FIG. 4. In addition, the base 21 has plural locking projections 212 and engaging hooks 213 formed at another side opposite to the inner wall 142. Furthermore, the base 21 is bored with a first through hole 214 corresponding to the cold water passage 161, a second through hole 215 corresponding to the hot water passage 162, and a third through hole 216 corresponding to the manual water exit passage 165.

The fixing member 22 is made of ceramic, provided with plural locking grooves 221 used to fixedly engage with the locking projections 212 of the base 21. Moreover, the fixing member 22 is bored with a cold water hole 222 corresponding to the first through hole 214 and communicating with the cold water passage 161, a hot water hole 223 corresponding to the second through hole 215 and communicating with the hot water passage 162, and a water exit hole 224 corresponding to the third through hole 216 and communicating with the manual water exiting passage 165.

The sliding member 23 is made of ceramic and installed at one side of the fixing member 22. The sliding member 23 is provided with a notch 231 communicating with the cold water hole 222, the hot water hole 223 and the automatic water entering passage 163, and a groove 232 formed in the center to communicate with the water exit hole 224. The sliding member 23 can horizontally move against the fixing member 22 to a first position shown in FIG. 8, and a second position shown in FIG. 10; at the first position, the groove 232 only communicates with the water exit hole 224; at the second position, the groove 232 communicates with the cold water hole 222, the hot water hole 223 and the water exit hole 224. Furthermore, a plurality of positioning grooves 233 are cut around the circumference of the sliding member 23.

The linking member 24 is located at one side of the sliding member 23 opposite to the fixing member 22, provided with plural positioning projections 241 employed to engage with the positioning grooves 233 so as to simultaneously move with the sliding member 23. Protruded at one side of the linking member 24 opposite to the sliding member 23 is a joint block 242 that has a joint groove 243 bored in the center and a long restricting groove 244 cut outwards at two corresponding sides of the joint groove 243 respectively.

The restricting member 25 is located at one side of the linking member 24 opposite to the sliding member 23, provided with a rectangular restricting hole 251 bored in the center to engage with the joint block 242, so that the linking member 24 can merely move along the longitudinal sides of the restricting hole 251. And the restricting member 25 has a restricting groove 252 cut in a portion of the circumference.

Figure 7:
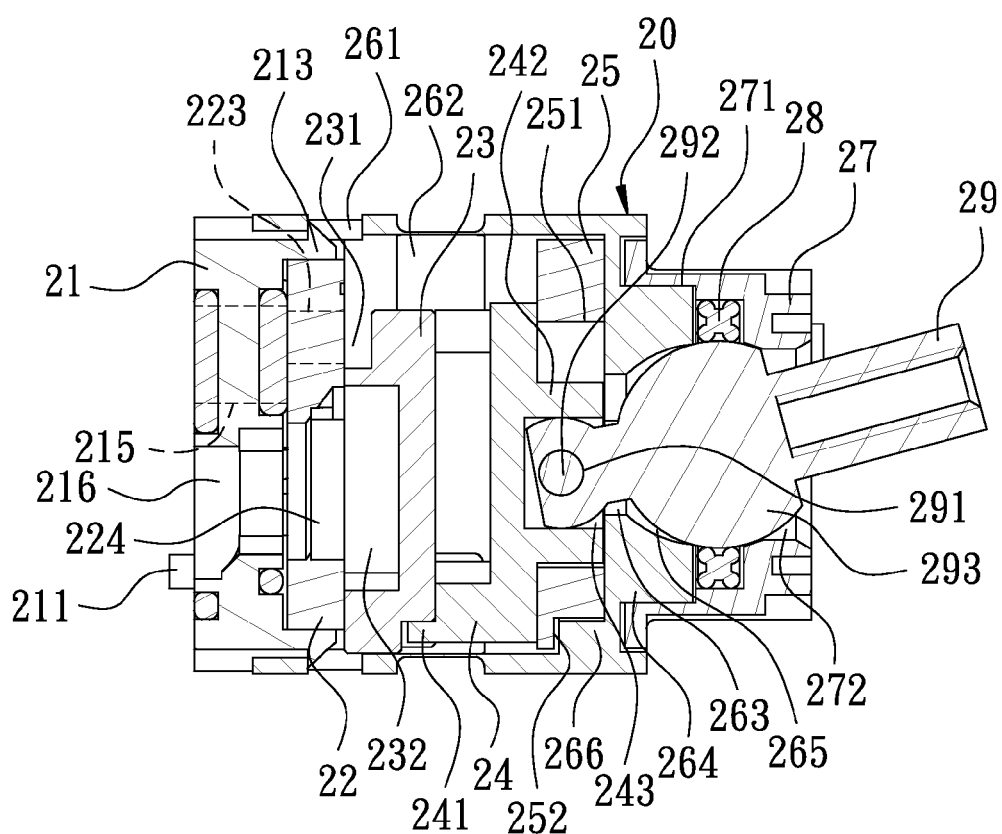
FIG. 7 is a vertical cross-sectional view of the ceramic valve in the present invention, showing a sliding member being positioned at a first position.

The shell 26 is provided with plural locking holes 261 used to engage with the engaging hooks 213 of the base 21 so as to keep the fixing member 22, the sliding member 23, the linking member 24 and the restricting member 25 shielded by the shell 26. At least a water exit 262 is bored on the shell 26, communicating with the notch 231 of the sliding member 23. The shell 26 also has a valve rod groove 263, a joint block 264 extended out from the valve rod groove 263, and a spherical groove 265 cut in the joint block 264 to communicate with the valve rod groove 263. Furthermore, as shown in FIG. 7, a restricting projection 266 is formed in the shell 26 to correspond to the restricting groove 252 of the restricting member 25 so as to limit the restricting member 25 to rotate in a confined angle.

The bush 27 is provided with a joint hole 271 formed in one side for being engaged with the joint block 264 to keep the bush 27 fixed outside the shell 26, and a through hole 272 formed in another side to correspond to the valve rod groove 263.

The washer 28 is inserted in the joint hole 271 of the bush 27.

The valve rod 29 is connected with the sliding member 23, operated to control the sliding member 23 to move against the fixing member 22. Successively inserted through the through hole 272 of the bush 27, the valve rod groove 263 of the shell 26 and the restricting hole 251 of the restricting member 25, the valve rod 29 has one end finally fitted in the joint groove 243 of the linking member 24. Transversely bored in one end of the valve rod 29 is a through hole 291 corresponding to the restricting grooves 244. A connecting bolt 292 is inserted in the through hole 291, having two ends extended outward to rest in the restricting grooves 244 so that the valve rod 29 is linked with the linking member 24 to command the sliding member 23. In addition, the valve rod 29 has a spherical portion 293 laid in the spherical groove 265 of the shell 26.

The electromagnetic valve 30 is installed in the accommodating chamber 11 of the main body 10, connected with the automatic water entering passage 163 and the automatic water exit passage 164, employed to control water flowing from the automatic water entering passage 163 to the automatic water exiting passage 164.

The sensor 40 is located near the inducing hole 12 in the accommodating chamber 11, electrically connected with the electromagnetic valve 30 to command it.

The battery set 50 is installed in the battery room 15 of the man body 10, electrically connected with the electromagnetic valve 30 and the sensor 40 to feed them with power.

The fixing base 60 is located at the chamber opening 111 of the main body 10 to make the main body 10 fixed on a platform (not shown in Figs). The fixing base 60 is provided with a cold water tube 61 connected with the cold water passage 161 and a cold water source (not shown in Figs), and a hot water tube 62 connected with the hot water passage 162 and a hot water source (not shown in Figs).

The valve base 70 is laid at the valve room opening 141 of the main body 10 to keep the ceramic valve 20 positioned in the valve room 14, connected with an operating rod 71 jointed with the valve rod 29 to command it.

The cap 80 is covered on the battery room opening 151 to confine the battery set 50 in the battery room 15.

Figure 8:
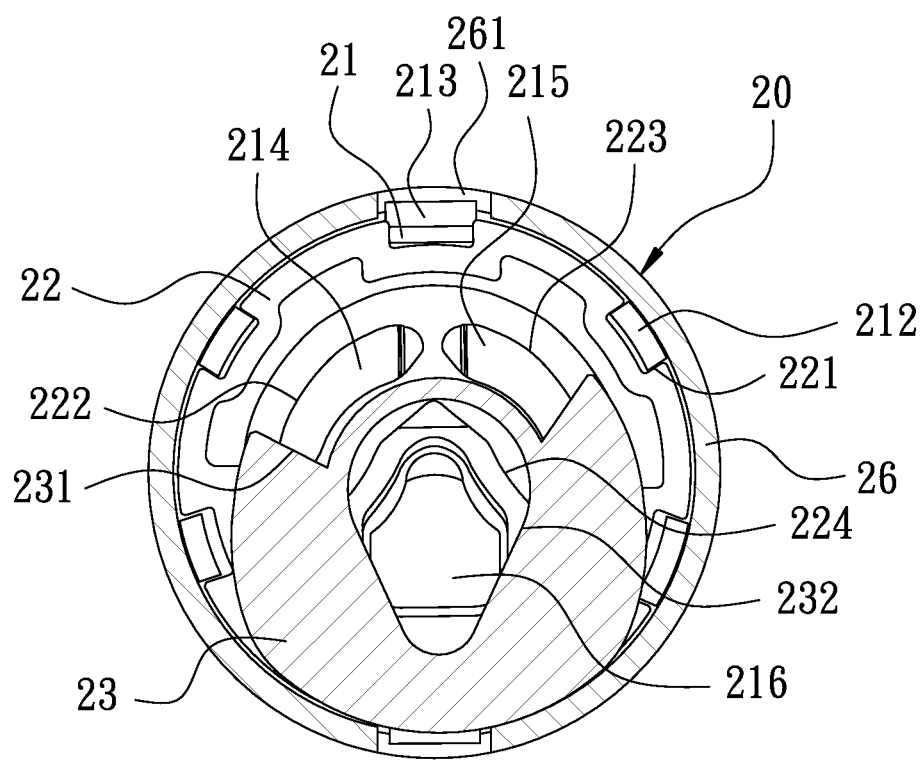
FIG. 8 is a horizontal cross-sectional view of the ceramic valve in the present invention, showing the sliding member being positioned at the first position.

In using, as shown in FIGS. 7 and 8, under normal condition, the sliding member 23 is positioned at the first position, with the groove 232 communicating with the water exit hole 224 only. That is, the cold water is to run through the cold water passage 161, the first through hole 214, the cold water hole 222, the notch 231 and the water exit 262 consecutively, and then into the valve room 14; the hot water is to run through the hot water passage 162, the second through hole 215, the hot water hole 223, the notch 231 and the water exit 262 consecutively, and then into the valve room 14. The cold water and the hot water are mixed in the valve room 14 to successively flow through the automatic water entering passage 163 to the electromagnetic valve 30. By the time, as long as the sensor 40 is induced by a hand, it enables the electromagnetic valve 30 to allow the mixed water in the automatic water entering passage 163 to run to the automatic water exit passage 164, and then flow out of the water exit tube 12. That is the automatic process of giving water by this faucet.

Figure 9:
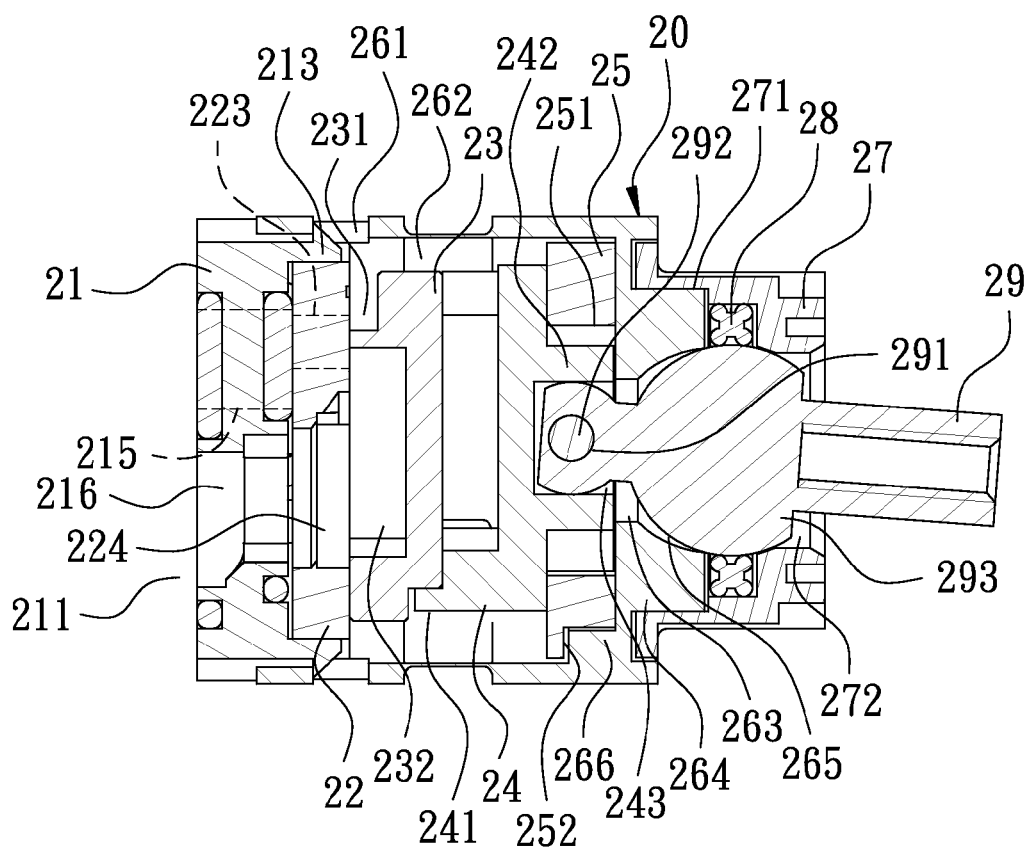
FIG. 9 is a vertical cross-sectional view of the ceramic valve in the present invention, showing the sliding member being positioned at a second position.
Figure 10:
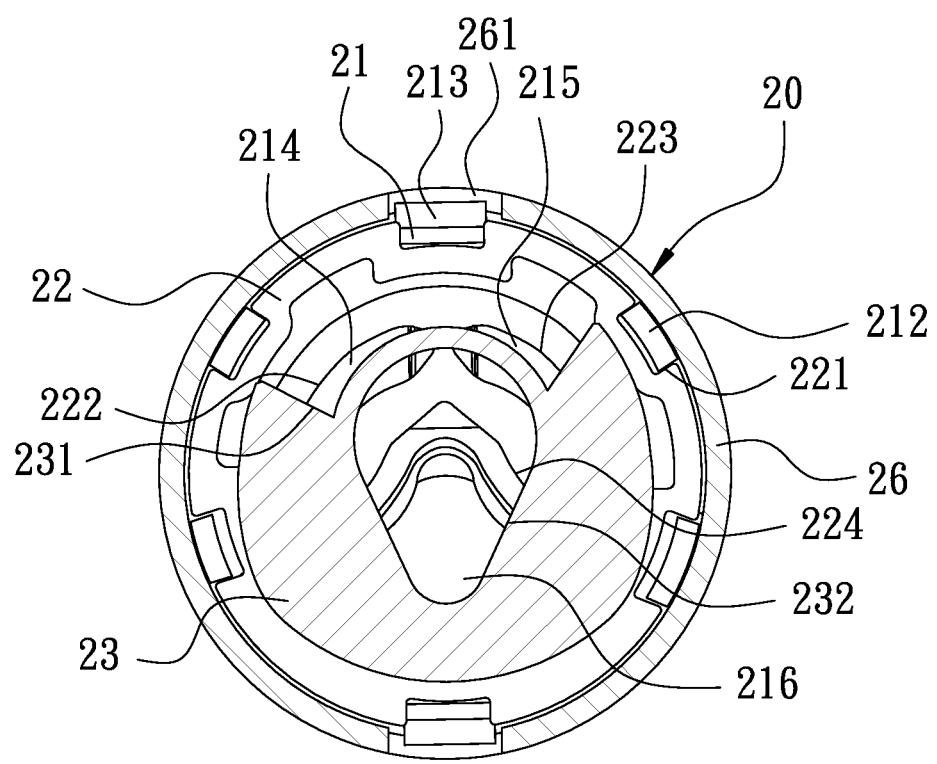
FIG. 10 is a horizontal cross-sectional view of the ceramic valve in the present invention, showing the sliding member being positioned at the second position.

Next, FIGS. 9 and 10 show how to operate the present faucet while the electromagnetic valve is out of work. First, a user can move the operating rod 71 of the valve base 70 to enable the valve rod 29 to swing downward. Then, the linking member 24 is to be driven by the valve rod 29 to make the sliding member 23 sliding to the second position. By the time, the groove 232 communicates with the cold water hole 222, the hot water hole 223 and the water exit hole 224, so that cold water and hot water can be mixed in the notch 232. The mixed water is next to flow through the water exit hole 224, the third through hole 216 and the manual water exit passage 165 to run out of the water exit tube 12. That is the manual process of giving water by this faucet.

Figure 11:
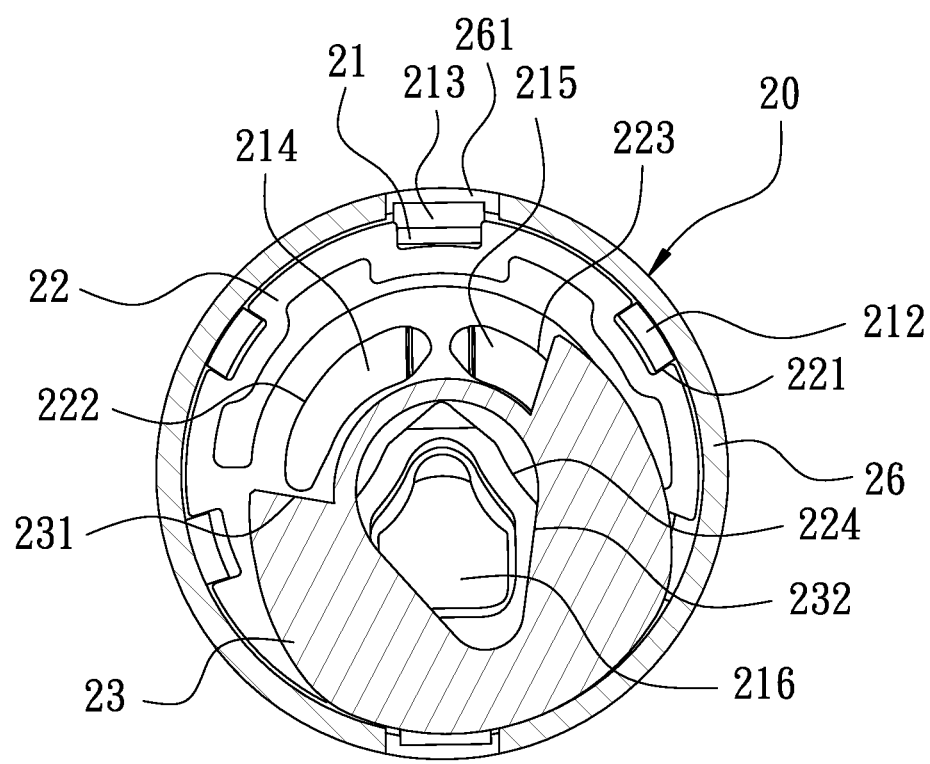
FIG. 11 is a horizontal cross-sectional view of the ceramic valve in the present invention, showing the sliding member being rotated to adjust water temperature.

As shown in FIG. 11, when water temperature is to be adjusted, a user just needs to rotate the valve rod 29 by means of the operating rod 71 of the valve base 70. By the time, the restricting member 25, the linking member 24 and the sliding member 23 can be simultaneously driven to rotate so that the overlapped area of the notch 231 of the sliding member 23, the cold water hole 222 and the hot water hole 223 can be shifted to control flow rate of cold water and hot water, achieving the purpose of adjusting water temperature.

Therefore, the manual/automatic and cold/hot faucet 100 of the present invention can give water automatically or manually. Moreover, as the ceramic valve 20 is highly resistant to abrasion, the faucet 100 can thus function durably, not apt to get leaked. And, as the main body 10 possesses the accommodating chamber 11, the valve room 14, the battery room 15, and the passage system 16, so the present faucet 100 can be easily assembled together, by placing the ceramic valve 20 in the valve room 14, the electromagnetic valve 30 and the sensor 40 in the accommodating chamber 11, and the battery set 50 in the battery room 15.

While the preferred embodiment of the invention has been described above, it will be recognized and understood that various modifications may be made therein and the appended claims are intended to cover all such modifications that may fall within the spirit and scope of the invention.

What is claimed is:

1. A manual/automatic and cold/hot faucet with a ceramic valve, said faucet comprising:
a main body provided with a water exit tube located at a top, an accommodating chamber and a valve room formed in said main body, a cold water passage and a hot water passage and an automatic water entering passage communicating with said accommodating chamber and said water exit tube, an automatic water exit passage communicating with said accommodating chamber and said water exiting tube, a manual water exit passage communicating with said valve room and said water exit tube;
a ceramic valve installed in said valve room and provided with a ceramic fixing member having a cold water hole communicating with said cold water passage, a hot water hole communicating with said hot water passage, a water exit hole communicating with said manual water exit passage, a ceramic sliding member installed at one side of said fixing member and provided with a notch formed at some circumference to communicate with said cold water hole and said hot water hole and said automatic water entering passage, a groove formed in a center of said sliding member to communicate with said water exit hole, said sliding member able to horizontally move against said fixing member to a first position and a second position, said groove only communicating with said water exit hole while being at said first position and only communicating with said cold water hole and said hot water hole and said water exit hole while being at said second position, said ceramic valve further provided with a valve rod connected with said sliding member so as to command said sliding member to slide against said fixing member;
an electromagnetic valve connected with said automatic water entering passage and said automatic water exit passage and employed to control water flowing from said automatic water entering passage to said automatic water exit passage; and
a sensor electrically connected with and commanding said electromagnetic valve.

2. The manual/automatic and cold/hot faucet with a ceramic valve as claimed in claim 1, wherein said ceramic valve is further provided with a base positioned on an inner wall of said valve room, said base having plural locking projections formed at another side opposite to said inner wall and utilized to correspondingly engage with locking grooves formed in said fixing member so as to make said fixing member fixed on said base, a first through hole bored in said base to correspond to said cold water passage so as to make said cold water hole of said fixing member communicating with said cold water passage, a second through hole bored in said base to correspond to said hot water passage so as to make said hot water hole of said fixing member communicating with said hot water passage, a third through hole bored in said base to correspond to said manual water exit passage so as to make said water exit hole of said fixing member communicating with said manual water exit passage.

3. The manual/automatic and cold/hot faucet with a ceramic valve as claimed in claim 2, wherein at least a fixing groove is formed on said inner wall of said valve room of said main body and correspondingly engaged with a fixing rod of said base so that said base can be positioned on said inner wall of said valve room.

4. The manual/automatic and cold/hot faucet with a ceramic valve as claimed in claim 1, wherein said ceramic valve is further provided with a linking member positioned at one side of said sliding member opposite to said fixing member, said linking member provided with plural positioning projections employed to engage with positioning grooves correspondingly formed in said sliding member so as to simultaneously move the sliding member, a joint block protruded at one side of said linking member and having a joint groove, a restricting groove further cut outwards at two corresponding sides of said joint groove respectively, said valve rod having one end inserted in said joint groove of said linking member and transversely bored with a through hole corresponding to said restricting grooves, a connecting bolt inserted in said through hole to keep two ends extended outward to rest in said restricting grooves so that said valve rod is linked with said linking member to command said sliding member.

5. The manual/automatic and cold/hot faucet with a ceramic valve as claimed in claim 4, wherein said ceramic valve is further provided with a restricting member located at one side of said linking member opposite to said sliding member, said restricting member provided with a rectangular restricting hole to correspondingly engage with said joint block of said linking member so that said linking member can merely move along longitudinal sides of said restricting hole.

6. The manual/automatic and cold/hot faucet with a ceramic valve as claimed in claim 1, wherein said ceramic valve is further provided with a shell used to shield said fixing member and said sliding member, said shell having at least one water exit communicating with said notch of said sliding member and a valve rod groove employed to enable said valve rod to extend out of said shell, said shell further provided with a joint block located next to said valve rod groove, a spherical groove cut in said joint block to communicate with said valve rod groove for adopting a spherical portion of said valve rod.

7. The manual/automatic and cold/hot faucet with a ceramic valve as claimed in claim 6, wherein said ceramic valve is further provided with a bush having a joint hole formed in one side for being engaged with said joint block of said shell to keep said bush fixed outside said shell, a through hole formed in another side of said bush for said valve rod to pass through.

\* \* \* \* \*